Patented June 19, 1934

1,963,069

UNITED STATES PATENT OFFICE 1,963,069

PREPARATION OF 1-BENZOYL-AMINO-4-CHLORO-ANTHRAQUINONE

Oakley Maurice Bishop, Wilmington, Del., and Charles J. Darlington, Woodstown, N. J., assignors to E. I. du Pont de Nemours & Company, Wilmington, Del., a corporation of Delaware No Drawing. Application January 30, 1931, Serial No. 512,480

17 Claims. (Cl. 260—60)

This invention relates to the preparation of halogenated anthraquinone compounds, especially 1-benzoyl-amino-4-chloro-anthraquinone. More particularly the invention is characterized by the employment of a novel process of production, a novel process of isolation and a final product of especial purity.

This invention has as an object an improved synthesis of certain anthraquinone compounds. Further objects are the production of organic compounds of particular purity, and in general an advancement of the art. Other objects will appear hereinafter.

These objects are accomplished by suspending alpha-amino-anthraquinone in a chloro-benzene or a mixture of chloro-benzenes, acylating, thereafter halogenating and finally separating the resultant product.

The invention will be readily understood from a consideration of the following examples in which the parts are given by weight.

Example I

One hundred (100) parts of technical alpha-amino-anthraquinone were suspended in 200 parts of mono-chloro-benzene and heated to 130° C. At this temperature 65 parts of benzoyl chloride were added at a sufficiently slow rate to prevent the charge from foaming over. The reaction mass was agitated during the addition of the benzoyl chloride and for one hour thereafter the temperature remaining the same. Afterwards an additional 400 parts of mono-chloro-benzene were added, the temperature adjusted to 90-95° C. and a slow stream of chlorine passed through the suspension until analysis of a sample showed the desired chlorine content. Sufficient sodium carbonate was then added to neutralize the charge, the mono-chloro benzene removed by steam distillation and the product filtered off, washed with water and dried.

Example II

One hundred (100) parts of technical amino-anthraquinone were suspended in 200 parts of ortho-di-chloro benzene and heated to 140-150° C. While maintaining this temperature 65 parts of benzoyl chloride were added with agitation of the suspension and at such a rate as to prevent loss by foaming. The agitation was continued for one hour after the addition of the last of the benzoyl chloride. Thereafter an additional 400 parts of ortho-di-chloro benzene were added, the temperature adjusted to 90-95° C. and the charge chlorinated and isolated as in Example I.

Example III

The process of Example II was carried out utilizing tri-chloro benzene as a solvent instead of the ortho-di-chloro-benzene mentioned.

If desired any mixture of the above listed solvents or suspension agents may be used. In any case the benzoylation temperature may be reduced to 120° C. and where the di-chloro- or tri-chloro-benzene or a mixture of the two is used for solvent, the temperature may be raised to 160° C. In all cases the chlorination temperature may be raised to 115° C.

If desired the total amount of the solvent may be added at the beginning of the process, in which case the chlorination follows the benzoylation directly.

The preferred amount of solvent is between 4 and 6 times the amount of the amino-anthraquinone. With extremely good agitation even less solvent may be used but greater mechanical difficulty is experienced because of the thickness of the mix. The products obtained by the above process may be separated in a very pure form by direct filtration and washing with alcohol or they may be obtained in a slightly more impure form by removing the solvent, chloro-benzene, by means of steam distillation and then filtering off the residue of 1-benzoyl-amino-4-chloro-anthraquinone. The removal of the solvent by steam distillation is especially desirable because of the great economy obtained through the large increase in yield.

The 1-benzoyl-amino-4-chloro-anthraquinone produced by the process of this invention has especially desirable characteristics for the preparation of dyestuffs.

The advantages of this invention are especially marked. The reaction masses are non-corrosive, the solvent is inexpensive and non-toxic, the process proceeds at a rate which may be readily controlled and it is not conducive to over-halogenation. When the solvent is removed by steam distillation, isolation of a much higher yield of the desired product is obtained than when the product is filtered directly from the original solvent medium.

As many apparently widely different embodiments of this invention may be made without departing from the spirit and scope thereof it is to be understood that we do not limit ourselves to the specific embodiments thereof except as defined in the appended claims.

We claim:

1. The art which comprises suspending about 100 parts of alpha-amino-anthraquinone in about 150–600 parts of a chloro-benzene, heating to about 120–160° C., adding about 65 parts of benzoyl-chloride, adding a chloro-benzene until the total amount of chloro-benzene present is about 400–600 parts, adjusting the temperature to about 90–115° C., passing in chlorine to produce a chlorinated anthraquinone compound, and separating the resultant product.

2. The art which comprises suspending about 100 parts of alpha-amino-anthraquinone in about 150–600 parts of a chloro-benzene, heating to about 120–160° C., adding about 65 parts of benzoyl-chloride, adding a chloro-benzene until the total amount of chloro-benzene present is about 400–600 parts, adjusting the temperature to about 90–115° C., passing in chlorine to produce a chlorinated anthraquinone compound, neutralizing the resultant reaction mass and separating the resultant product.

3. The art which comprises suspending about 100 parts of alpha-amino-anthraquinone in about 150–600 parts of a chloro-benzene, heating to about 120–160° C., adding about 65 parts of benzoyl-chloride, adding a chloro-benzene until the total amount of chloro-benzene present is about 400–600 parts, adjusting the temperature to about 90–115° C., passing in chlorine to produce a chlorinated anthraquinone compound, neutralizing the resultant reaction mass, removing the chloro-benzene and separating the resultant product.

4. The product obtainable by suspending about 100 parts of alpha-amino-anthraquinone in about 150–600 parts of a chloro-benzene, heating to about 120–160° C., adding about 65 parts of benzoyl-chloride, adding a chloro-benzene until the total amount of chloro-benzene present is about 400–600 parts, adjusting the temperature to about 90–115° C., passing in chlorine to produce a chlorinated anthraquinone compound.

5. The product obtainable by suspending about 100 parts of alpha-amino-anthraquinone in about 150–600 parts of a chloro-benzene, heating to about 120–160° C., adding about 65 parts of benzoyl-chloride, adding a chloro-benzene until the total amount of chloro-benzene present is about 400–600 parts, adjusting the temperature to about 90–115° C., passing in chlorine to produce a chlorinated anthraquinone compound, neutralizing the resultant reaction mass and separating the resultant solid.

6. The method of preparing 1-benzoyl-amino-4-chloro-anthraquinone which comprises benzoylating and thereafter chlorinating alpha-amino-anthraquinone in a chloro-benzene.

7. The method of preparing 1-benzoyl-amino-4-chloro-anthraquinone which comprises benzoylating and thereafter chlorinating alpha-amino-anthraquinone in a mono-chloro-benzene.

8. The method of preparing 1-benzoyl-amino-4-chloro-anthraquinone which comprises benzoylating and thereafter chlorinating alpha-amino-anthraquinone in a di-chloro-benzene.

9. The method of preparing 1-benzoyl-amino-4-chloro-anthraquinone which comprises benzoylating and thereafter chlorinating alpha-amino-anthraquinone in a tri-chloro-benzene.

10. In the method of preparing 1-benzoyl-amino-4-chloro-anthraquinone the step of halogenating in a chloro-benzene the product which is substantially identical with that resulting from the benzoylation of alpha-amino anthraquinone in a chloro-benzene.

11. In the method of preparing 1-benzoyl-amino-4-chloro-anthraquinone the step of halogenating in a mixture of chloro-benzenes the product which is substantially identical with that resulting from the benzoylation of alpha-amino anthraquinone in a chloro-benzene.

12. In the method of preparing 1-benzoyl-amino-4-chloro-anthraquinone the steps of halogenating in a chloro-benzene the product which is substantially identical with that resulting from the benzoylation of alpha-amino-anthraquinone in a chloro-benzene, and thereafter steam distilling off the chloro-benzene.

13. The process of preparing a 1-acyl-amino-4-halogen-anthraquinone which comprises acylating alpha-amino-anthraquinone in a chloro-benzene, and halogenating the resultant reaction mass.

14. The process of preparing 1-acyl-amino-4-chloro-anthraquinone which comprises acylating alpha-amino-anthraquinone in a chloro-benzene, and chlorinating the resultant reaction mass.

15. The process of preparing a 1-acyl-amino-4-chloro-anthraquinone which comprises acylating alpha-amino-anthraquinone in a chloro-benzene, adjusting the amount of the chloro-benzene to 4 to 6 times the amount of alpha-amino-anthraquinone, chlorinating the resultant reaction mass and separating the solid produced.

16. The process of preparing a 1-acyl-amino-4-chloro-anthraquinone which comprises acylating alpha-amino-anthraquinone in a chloro-benzene, adjusting the amount of the chloro-benzene to 4 to 6 times the amount of alpha-amino-anthraquinone, chlorinating the resultant reaction mass and steam distilling off the chloro-benzene.

17. The process of preparing 1-benzoyl-amino-4-chloro-anthraquinone which comprises benzoylating and chlorinating in the same solvent and thereafter steam distilling off the solvent.

OAKLEY MAURICE BISHOP.
CHARLES J. DARLINGTON.